Figure 1:
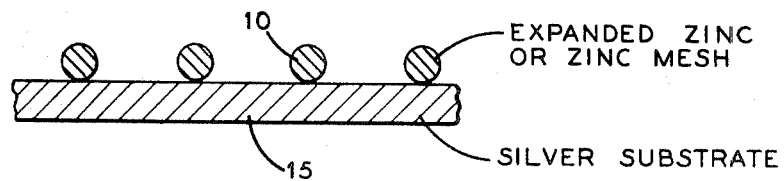

United States Patent

[11] 3,607,406

[72] Inventor Nikola Marincic
 Winchester, Mass.
[21] Appl. No. 831,463
[22] Filed June 9, 1969
[45] Patented Sept. 21, 1971
[73] Assignee P. R. Mallory & Co. Inc.
 Indianapolis, Ind.

[54] POROUS ELECTRODE PREPARATION
 13 Claims, 3 Drawing Figs.
[52] U.S. Cl. ................................................ 136/20,
 136/24, 136/28, 136/83
[51] Int. Cl. ..................................................... H01m 43/04
[50] Field of Search ........................................... 136/120,
 83, 20, 24, 28, 30, 31, 26, 27, 125, 126; 75/109, 107

[56] References Cited
UNITED STATES PATENTS

| | | | |
|---|---|---|---|
| 3,288,643 | 11/1966 | Stark | 136/24 |
| 3,297,433 | 1/1967 | Stark | 75/109 |
| 3,305,397 | 2/1967 | Stark | 136/24 |

FOREIGN PATENTS

| | | | |
|---|---|---|---|
| 527,116 | 10/1940 | Great Britain | 75/109 |
| 1,075,127 | 7/1967 | Great Britain | 136/120 |

Primary Examiner—Winston A. Douglas
Assistant Examiner—M. J. Andrews
Attorney—Robert Levine ABSTRACT: A porous electrode is prepared on a geometrical surface of desired form by employing a substrate of such desired structure, covering the substrate with a material mix of a metal or salt of a metal that is lower, or less active, on the electromotive series, and then treating such superposed structure on the substrate with a solution of a salt of a metal that is more active or higher on the activity or electromotive series, with the radical in the salt of the high-activity metal such as to form a soluble salt with the low-activity metal, whereupon, after completion of the reaction between the two salts, or metal and salt, to the extent possible with the available ingredients, the desired high-activity metal will be precipitated out of its solution to form a continuous porous structure, while the low-activity metal will be reacted into a salt, which, together with the other byproducts of the reaction, can be washed out by a suitable solvent, such as water, leaving the porous electrode form on its supporting substrate, to be used as an electrode in a battery, for example, or as a filter unit in a suitable filter, to which the structural dimensions of the porous unit will correspond by design.

(BEFORE CADMIUM CHLORIDE POURED OVER)

(AFTER)

INVENTOR.
Nikola Marinčić
BY
ATTORNEY 3,607,406

POROUS ELECTRODE PREPARATION

DESCRIPTION

This invention relates to a porous structure which may be used as a filter, or as an electrode for a battery, and relates also to the method of producing the porous structure.

The desirability of a porous structure for use as a filter is indicated by the nature of the use, since, presumably, the passages in the filter will be small enough to trap small particles of undesirable or foreign matter, and, thus, separate them from a liquid that is to be filtered.

The desirability of a porous electrode for use in a battery, arises from the fact that such porosity of the electrode exposes a larger area of surface to the electrolyte so that larger currents may be generated and obtained from the battery.

One object of this invention is to utilize the activity relationship of the various metals in the electromotive or activity series, in order to control the formation of a porous structure of a desired metal by utilizing its higher activity characteristics to replace or substitute for a lower activity metal in the series, in an originally formed structure that will conform to the desired ultimate dimensional design.

Another object of the invention is to provide for the formation of a porous structure by simple chemical reaction to establish deposition of a desired metallic structure from a treated volume, and then washing out and eliminating the undesired portion of the treated volume and the byproducts of the reaction, to leave only the porous structure available as an end product, without further mechanical treatment.

Another object of the invention is to provide a porous structure of desired material having a definite porosity related to the volume of the object.

Another object of the invention is to provide a novel technique for porous electrode preparation, with a predesigned size, shape and distribution of pores.

Another object of the invention is to provide a process for forming a porous metal structure of controlled porosity, by starting with physical mixtures or fluid solutions containing a predetermined percentage of reactant materials to be active in the process, and then treating those reactant materials with other reactant materials to cause a reaction of metal substitution, whereby a porous structure will be formed of a desired metal of one of the reactants, with the undesirable materials left as soluble secondary byproducts which can be leached out of the porous structure, and then performing that operation of leaching or washing out the undesirable products in order to leave the desired porous structure as a finished unit.

Generally, the technique of forming the porous structure is based on the displacement reaction in which a less noble metal, that is, less electropositive, is used to reduce a salt of a more noble metal, that is, one more electropositive. The more noble metal is precipitated from its salt to form a desired porous deposit either on a solid substrate of the same metal, or on a solid substrate of a different metal.

Foreign inert bodies can be incorporated into the initial mass to control the resulting structure either for porosity, or for mechanical strength, or for any other reason. The foreign bodies can be used during the preparation of the porous structure, and removed afterwards, for similar reasons, or as desired, thus permitting extreme flexibility procedurally and in end result.

The application of the above principle has been employed in various ways, of which a few are shown in the following examples:

Example 1

An expanded zinc plate was flooded with 0.2 mole $PB(NO_3)_2$ and left alone for 1 hour. A porous lead structure resulted from the reaction.

Example 2

5 grams of aluminum powder were placed between two layers of filter paper, forming a 2-millimeter thick layer of loose powder. The powder was flooded with 1 mole $CdCl_2$, and left for the reaction to complete, and then leached with distilled water. A porous cadmium structure resulted.

Example 3

A mixture was prepared, comprising 15 grams of zinc powder, 40 grams of $CdCl_2$ and 10 grams of sugar. Pellets were pressed applying 15,000 pounds per square inch. After full reaction, the structure was leached with distilled water. A porous cadmium electrode resulted.

Example 4

Three layers of expanded zinc plate were put together, degreased with acetone, and flooded with a 2 mole $CdCl_2$ solution. Elastic cadmium felt resulted, applicable as a metallic filter or as an electrode.

Example 5

A single layer of expanded zinc plate was placed on top of a sheet of solid silver foil. A solution of 2 mole $CdCl_2$ was poured over, while the expanded zinc was pressed gently with a wooden roller against the silver foil. A porous cadmium deposit on the silver substrate resulted, replicating exactly the pattern and the texture of the expanded zinc used. A microscopic investigation disclosed three types of porosity, shown schematically in the drawings.

Figure 2:
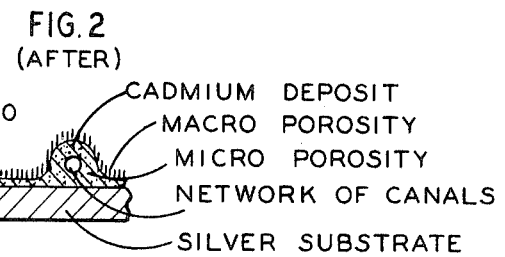
Figure 3:
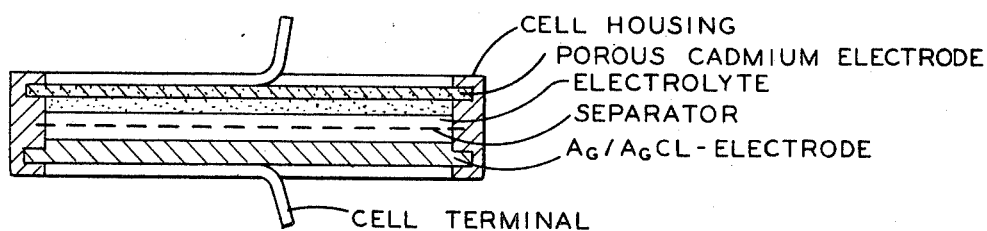

It has been found that different types of porosity have been obtainable by the procedures here disclosed, as shown in somewhat more detail in the drawings annexed hereto, in which FIG. 1 is a schematic arrangement showing a section of expanded zinc or zinc mesh overlaid on a silver substrate;

FIG. 2 is a schematic showing of the structure formed as a porous structure after treatment and the displacement reaction in the arrangement shown in FIG. 1, with the different types of porosity indicated; and FIG. 3 is a sectional view of a silver-cadmium cell to illustrate the disposition and utility of a porous cadmium electrode as an element of a silver-cadmium cell, in order to enjoy the advantages of the porous electrode formed in accordance with the present invention.

As indicated above, the invention herein generally consists in establishing a displacement reaction in which a more noble metal is precipitated from its salts to form a porous deposit on an available substrate provided for that purpose.

An ultimate structure within predesigned dimensional limits may thus be readily and simply achieved by arranging the displacement reaction in situ on an initial structure of substantially the same predesign dimensions. In FIG. 1, the operation of the treatment considered in example 5 is illustrated. A layer of expanded zinc or zinc mesh 10 is laid on a silver substrate 15, consisting of solid silver foil, and then the solution of 2 mole $CdCl_2$, as mentioned, poured over the structure, while the expanded zinc is gently pressed against the silver foil by a suitable tool, such as a wooden roller. Microscopic investigation of the final product showed three types of porosity, as shown schematically in FIG. 2, after the soluble zinc chloride as a displacement reaction product was leached out.

The cadmium electrode structure showed a microporosity 20 close to the surface, with decreasing microporosity 25 toward the axes of the original zinc mesh rods or filaments 10, and with a final network of canals 30 axially, but not necessarily continuous, along the axial regions of the original zinc rods 10.

The above cadmium electrode from FIG. 2 was incorporated into an electrochemical secondary cell, comprising this electrode, a Ag/AgCl electrode and 2 mole $CdCl_2$ plus 1 mole $NaClO_4$ as an electrolyte. The cell is conventionally represented as follows:

Cd(Ag)/CdCl$_{2(Aq)}$/Ag

FIG. 3 represents the cell schematically. The cell was charged for one minute with 200 mA/cm² of the geometric area and discharged with 20 mA/cm² with 100 percent discharge efficiency.

The principles governing the selection of suitable materials are immediately apparent to one practicing in the art. Thus, lead electrodes may be formed from soluble lead salts by means of aluminum, magnesium or zinc, forming the porous lead structure in aqueous or organic solutions. Zinc may not be formed in aqueous solutions by means of aluminum or magnesium because of hydrogen evolution. The correct relationship must exist between the half-cell potential of the components and the hydrogen evolution overvoltage on the metals used.

ADVANTAGES OF THE INVENTION

The present invention provides means and method for the preparation of porous metallic structures which:

1. Can have any desired porosity, containing as little as 5–10 percent of a metal by volume.
2. Can be produced either in the form of prepressed pellets, elastic sponge of metallic fibers or with a solid metallic or nonmetallic backing.
3. Can be produced with a predesigned single-type or a multiple-type porosity, depending on a material balance and a geometrical distribution of the reactants and the foreign bodies before the reaction starts.
4. Can be produced with 100 percent material utilization, which is particularly important when expensive metals are used.
5. Can be produced extremely fast and economically, since the major reaction occurs almost instantaneously, as soon as all the reactants are put in contact.
6. Can be produced on a large scale and cut to a desired size and shape after the major chemical reaction is over.
7. Can be stored for an indefinite period of time before it is incorporated into an electrochemical cell if used as a battery electrode.
8. Has a high mechanical strength superior to most of the known conventional porous electrodes and felted metal structures.

Thus, by use of the displacement principle, in a manner such as disclosed herein, or by similar equivalent manner, a porous structure may be formed in dimension and form as desired and in situ where that is desired. Moreover, by use of material of different size mesh for reaction and leaching out, porosity can be controlled, and, as previously mentioned inclusion of inert bodies may be employed for strength also. All such variations may be made within spirit and scope of the invention as herein disclosed and claimed.

In the claims, the physical and chemical characteristics of the reaction materials or compounds, in power or crystal form or in solution, are included in the term "reaction form."

What is claimed is:

1. A process for preparing a porous metallic structure for use as an electrode comprising the steps of providing a solid foil substrate of a noble metal; placing on top of said substrate a layer of a second metal structure having a predesigned patterned mesh form and volumetric dimensions; pouring over said layer and substrate a liquid solution of a soluble salt of a third metal in ion form; said second metal being more highly reactive than said third metal ion so that said second metal will react by going into solution to replace said third metal ion in order to precipitate said ion as a third metal in situ onto said substrate; and producing on said substrate a porous deposit structure of said third metal replicating exactly the pattern and the texture of the second metal structure, said structure comprising axial predesigned porous patterned precipitate metal deposits having a network of canals at the center of each deposit with said canals extending axially along the central axial region of each deposit, said deposit also having a porosity pattern of microporosity close to the outside surface of each deposit with decreasing microporosity toward said central network of canals.

2. The process of claim 1 wherein said noble metal is silver; wherein said second metal is zinc; and wherein said third metal is cadmium.

3. The process of claim 1, wherein said noble metal is silver; wherein said second metal is selected from the group consisting of aluminum, magnesium, and zinc; and wherein said third metal is lead.

4. The process of claim 1 wherein said noble metal is silver; wherein said second metal is selected from the group consisting of aluminum and magnesium; wherein said third metal is zinc; and wherein said solution is an organic liquid solution.

5. A metal electrode structure comprising a solid noble metal foil substrate; and a metal electrode deposited onto said substrate, said electrode comprising axial predesigned porous patterned precipitate metal deposits having a network of canals at the center of each deposit with said canals extending axially along the central axial region of each deposit, said deposit also having a porosity pattern of microporosity close to the outside surface of each deposit with decreasing microporosity toward said central network of canals.

6. The metal electrode structure of claim 5, wherein the solid foil substrate consists of silver, and wherein the deposited metal is cadmium.

7. The metal electrode structure of claim 6 wherein the deposited metal is lead.

8. The metal electrode structure of claim 6 wherein the deposited metal is zinc.

9. A deposited metal electrode for use with a solid noble metal substrate comprising axial predesigned porous patterned precipitate metal deposits having a network of canals at the center of each deposit with said canals extending axially along the central axial region of each deposit, said deposit also having a porosity pattern of microporosity close to the outside surface of each deposit with decreasing microporosity toward said network of canals.

10. The deposited metal electrode of claim 9 wherein the deposited metal is cadmium.

11. The deposited metal electrode of claim 9 wherein the deposited metal is lead.

12. The deposited metal electrode of claim 9 wherein the deposited metal is zinc.

13. An electrochemical cell comprising a cathode; an electrolyte; and an anode structure comprising a solid silver foil substrate and a cadmium electrode comprising axial predesigned porous patterned precipitate cadmium deposits having a network of canals at the center of each deposit with said canals extending axially along the central axial region of each deposit, said deposit also having a porosity pattern of microporosity close to the outside surface of each deposit with decreasing microporosity toward said central network of canals.